(12) United States Patent
Shinjo

(10) Patent No.: US 8,046,908 B2
(45) Date of Patent: Nov. 1, 2011

(54) PRESS FOR ATTACHING NUTS TO PIPES

(75) Inventor: Tadashi Shinjo, Sakai Osaka (JP)

(73) Assignee: Shinjo Manufacturing Co., Ltd., Osaka (JP)

( * ) Notice: Subject to any disclaimer, the term of this patent is extended or adjusted under 35 U.S.C. 154(b) by 1068 days.

(21) Appl. No.: 11/863,473

(22) Filed: Sep. 28, 2007

(65) Prior Publication Data

US 2008/0078078 A1    Apr. 3, 2008

(30) Foreign Application Priority Data

Sep. 28, 2006    (JP) .................. 2006-264068

(51) Int. Cl.
*B23P 19/06* (2006.01)

(52) U.S. Cl. ............... 29/798; 29/243.518; 29/243.519; 29/432.2; 29/714; 29/716

(58) Field of Classification Search ............ 29/798, 29/243.5, 243.517, 243.518, 243.519, 243.55, 29/432.1, 432.2, 510, 714, 715, 716

See application file for complete search history.

(56) References Cited

U.S. PATENT DOCUMENTS

| | | |
|---|---|---|
| 3,851,373 A | 12/1974 | Shinjo |
| 5,329,694 A | 7/1994 | Sickels et al. |
| 7,559,136 B2 * | 7/2009 | Shinjo et al. .......... 29/798 |

FOREIGN PATENT DOCUMENTS

JP    53-016394    2/1978

* cited by examiner

*Primary Examiner* — Sarang Afzali
(74) *Attorney, Agent, or Firm* — Antonelli, Terry, Stout & Kraus, LLP.

(57) ABSTRACT

A press for attaching nuts to pipes has an upper base, a lower base, a movable support having a base end supported at a rear end of the lower base and a front end extending to the front end side of the lower base, a nut receiving recess provided in a piston of a hydraulic cylinder at the front end of the movable support and disposed at the upper end of a lower pattern, a lifter for the movable support, a stopper for the middle position of the movable support, a crimping die as an upper pattern mounted on the upper pattern support and movably disposed vertically on a same axial line as the lower pattern, and a hydraulic cylinder for pressing an upper pattern disposed on the upper base, and pressing the crimping die downward.

12 Claims, 6 Drawing Sheets

PRESS FOR ATTACHING NUTS TO PIPES

FIELD OF THE INVENTION

The present invention relates to a press for attaching nuts to pipes, especially inside of a metal square pipe.

BACKGROUND ART

Patent document 1 discloses a device for attaching a nut to a pipe by attaching to the inner wall of a metal square pipe so as to tighten with screw from outside of the square pipe, by using a so-called self-piercing nut in which each nut punches a hole in a metal sheet, and the rim of this hole is crimped simultaneously and pressed into the side wall groove of the nut, and attached to the metal sheet.

The device disclosed in patent document 1 is a manual device, which has not been put in practical use so far in the conventional background.

Patent Document 1: Japanese Patent Application Publication No. 53-16394 (Japanese Patent No. 0943112)

SUMMARY OF THE INVENTION

The invention is realized by improving the device disclosed in Patent Document 1, and it is hence an object thereof to present a press for attaching nuts to pipes, especially suited to attaching nuts to pipes of small diameter, capable of attaching nuts to pipes automatically.

To achieve the object, the press of the invention is characterized by comprising: a frame having an upper base fixed and supported on guide posts erected at both sides of a front part of a lower base, a movable support having a base end supported rotatably around a horizontal axis at a rear end of the lower base, and a front end extending to the front end side of the lower base so as to be movable circularly in a vertical direction, thereby covering and supporting pipes, a hydraulic cylinder for pressing a box-like lower pattern disposed at the front end of the movable support, a lower pattern disposed in a piston of the hydraulic cylinder, and moving up and down by projecting upward from a cylinder case, a nut receiving recess provided at the upper end of the lower pattern, a lifter for moving up and down the front end position of the movable support by abutting against and supporting in a slightly lifted state, a stopper for abutting against and supporting the middle position of the movable support by lifting slightly, and moving up and down so that the opening end face of the pipe attached to the movable support may be positioned in contact therewith, an upper pattern support movably provided up and down along the guide post, a crimping die as upper pattern mounted on the upper pattern support by way of a back plate and a die holder, and movably disposed vertically on a same axial line as the lower pattern, and a hydraulic cylinder for pressing an upper pattern disposed on the upper base, and pressing the upper pattern support downward with its piston rod disposed on a same axial line as the crimping die, in which the output for pressing the crimping die downward through the upper pattern support by the hydraulic cylinder for pressing the upper pattern is set larger than the output for pressing the lower pattern upward by the hydraulic cylinder for pressing the lower pattern.

The lifter has a round inclined guide surface on its top, and is forced to abut against and support the movable support by a spring or an air cylinder provided in the lower base, and when attaching the pipe to the movable support and the hydraulic cylinder for pressing the lower pattern, the pipe moves along the inner side of the inclined guide surface, and the lifter is pushed down.

The stopper has a touch sensor function, and the end face of the pipe attached to the movable support and the hydraulic cylinder for pressing the lower pattern abuts against the stopper and positioned, while, in cooperation, the hydraulic cylinder for pressing the lower pattern and the hydraulic cylinder for pressing the upper pattern are operated automatically.

The back plate is provided with a scrap discharge passage communicating with a hollow hole of the crimping die, and opened in a lateral outside direction.

According to the invention having such configuration, a nut can be attached easily to a pipe, especially metal square pipe, without piercing a mounting hole, and the nut can be screwed tightly from outside of the pipe. In particular, the press of the invention is suited to attaching of nuts to pipes of small diameter.

The press of the invention can be automated easily, and nuts can be attached to inside of pipes easily and efficiently.

THE PREFERRED EMBODIMENTS

Figure 1:
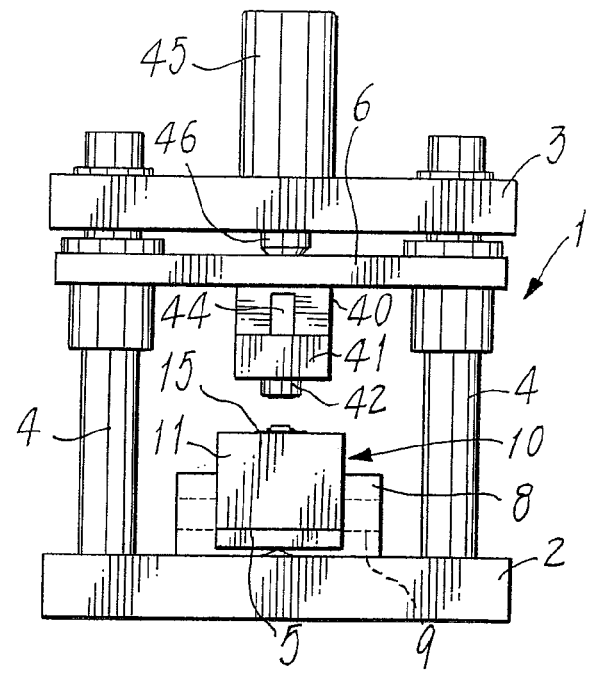
FIG. 1 is a front view of a press for attaching nuts to pipes of the invention.
Figure 2:
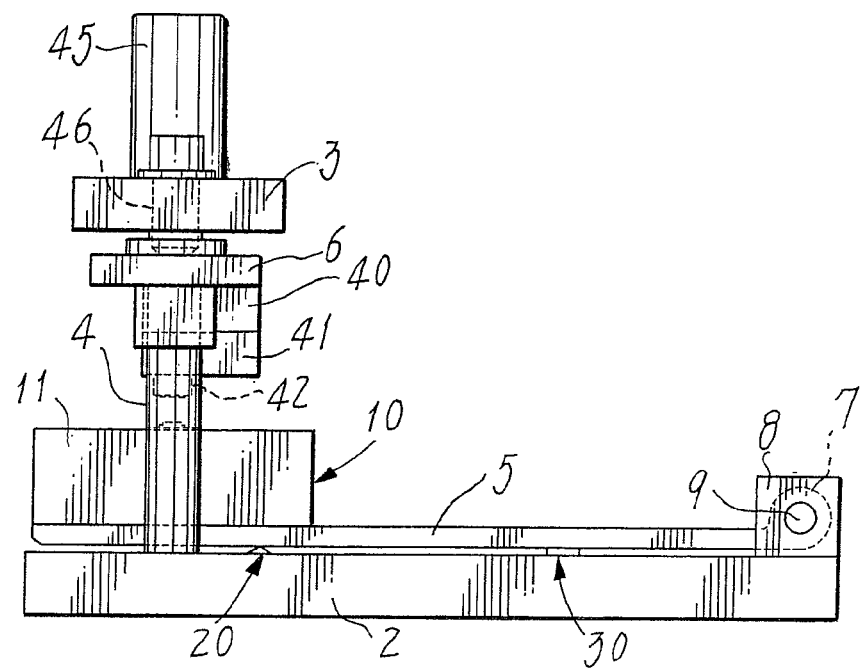
FIG. 2 is a side view of the press.
Figure 3:
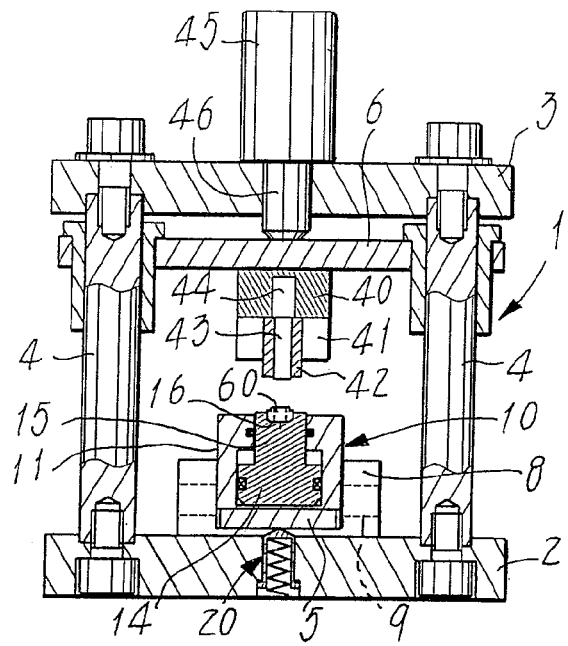
FIG. 3 is an essential longitudinal front view of the press.

Preferred embodiments of the invention are described below while referring to the accompanying drawings.

FIG. 1 to FIG. 4 show a press of the invention for attaching nuts to pipes, and the press is used for attaching a self-piercing nut 60 from inside to a meal square pipe 50 (see FIG. 5, FIG. 5) described below. A frame 1 of the press has an upper base 3 fixed and supported on the upper end of two guide posts 4, 4 erected in parallel to both sides of the front end of a long lower base 2 extending in a longitudinal direction.

The lower base 2 is provided with a long and flat movable support 5 extending in a longitudinal direction, and the upper base 3 is provided with a flat upper pattern support 6 movably in a vertical direction orthogonal to the lower base 2 along the guide posts 4, 4.

Figure 4:
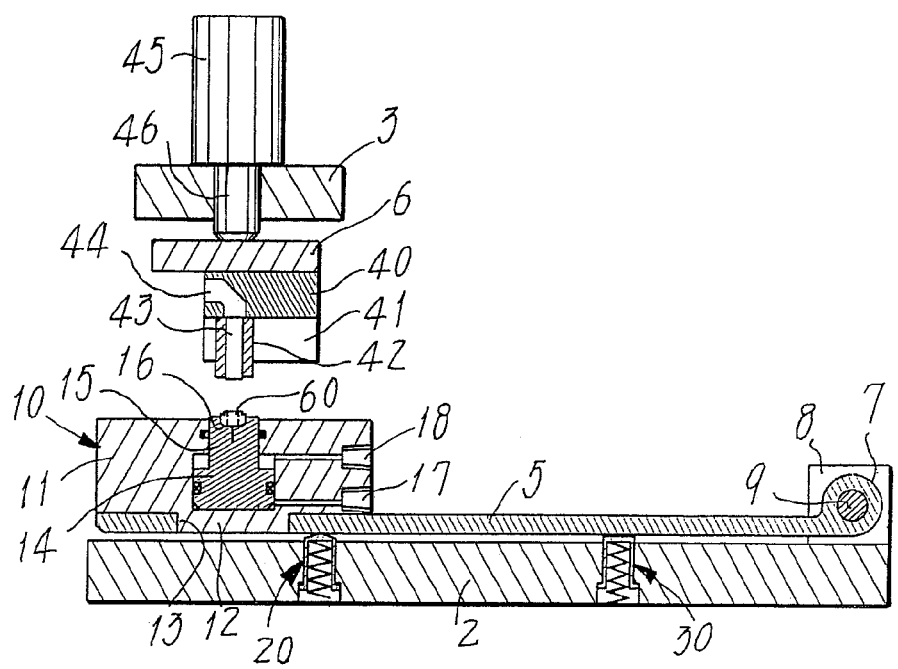
FIG. 4 is an essential longitudinal side view of the press.

The movable support 5 has a bearing 7 (see FIG. 2, FIG. 4) provided on a base end (rear end), supported on a support element 8 projecting to the rear end of the lower base 2 by way of a lateral axis 9, and the front end is disposed on the lower base 2 in a circularly movable state in vertical direction on the lateral axis 9. A box-like hydraulic cylinder 10 for pressing the lower pattern is disposed on the top of the front end of the movable support 5. The hydraulic cylinder 10 is a double acting type, and so as to be applicable to a pipe 50 of small diameter by minimizing the vertical height, as shown in FIG. 4, a bump 12 formed in the bottom of a cylinder case 11 is fitted in and fixed in a mounting hole 13 provided at the front end of the movable support 5. If the diameter of the pipe is relatively large, the box-like cylinder case 11 not forming a bump 12 may be directly installed on the top of the front end of the movable support 5.

The cylinder case 11 accommodates a piston 14 moving up and down, and at the upper end of the piston 14, a lower pattern 15 projecting upward from the cylinder case 11 is formed integrally. In the center of the upper end of the lower pattern 15, a nut receiving recess 16 is provided for fitting and holding the main body bottom of a self-piercing nut 60 described below. In the illustrate preferred embodiment, the self-piercing nut 60 is fitted to the nut receiving recess 16 manually, but by using a robot not shown, the self-piercing nut 60 may be automatically inserted into the nut receiving recess 16. Presence or absence of nut 60 fitted and held in the nut receiving recess 16 is detected by a photo sensor not shown. The cylinder case 11 is further provided with, as shown in FIG. 4, an ascending hydraulic port 17 and a descending hydraulic port 18 to be connected to a hydraulic pump not shown.

The lower base 2 is provided with a vertical moving lifter 20 for abutting against and supporting the movable support 5 by slightly lifting the front end position, and a vertical moving stopper 30 for abutting against and supporting the movable support 5 by slightly lifting the middle position or rear end position, and positioning by contacting with an opening end 51 of a square pipe 50 attached to the movable support 5 and hydraulic cylinder 10 for pressing the lower pattern as described below.

Figure 10:
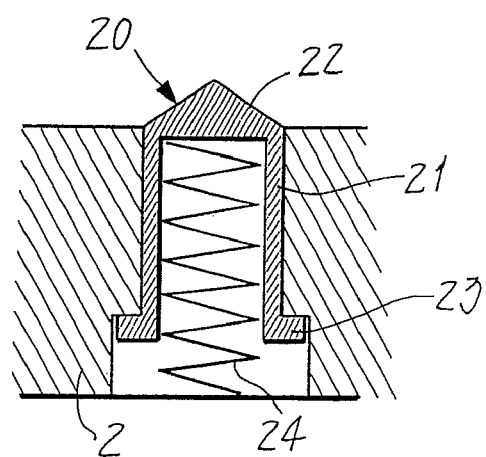
FIG. 10 is a longitudinal side view of the lifter of the press.

The lifter 20, as shown in FIG. 10, includes a conical top 22 at the upper end, and a metal cylindrical main body 21 having a flange 23 at the lower end provided movably and vertically on the lower base 2, with the conical top 22 being forced by a push-up spring 24 so as to project from the lower base 2, and abuts against and supports with the front end position of the movable support 5 slightly lifted by the conical top 22, and thereby pushes down the cylindrical main body 21 by resisting the push-up spring 24. On the other hand, the projecting amount of the conical top 22 is defined by the flange 23. The lifter 20 may be either single, or a plurality provided in parallel in lateral direction.

Figure 6:
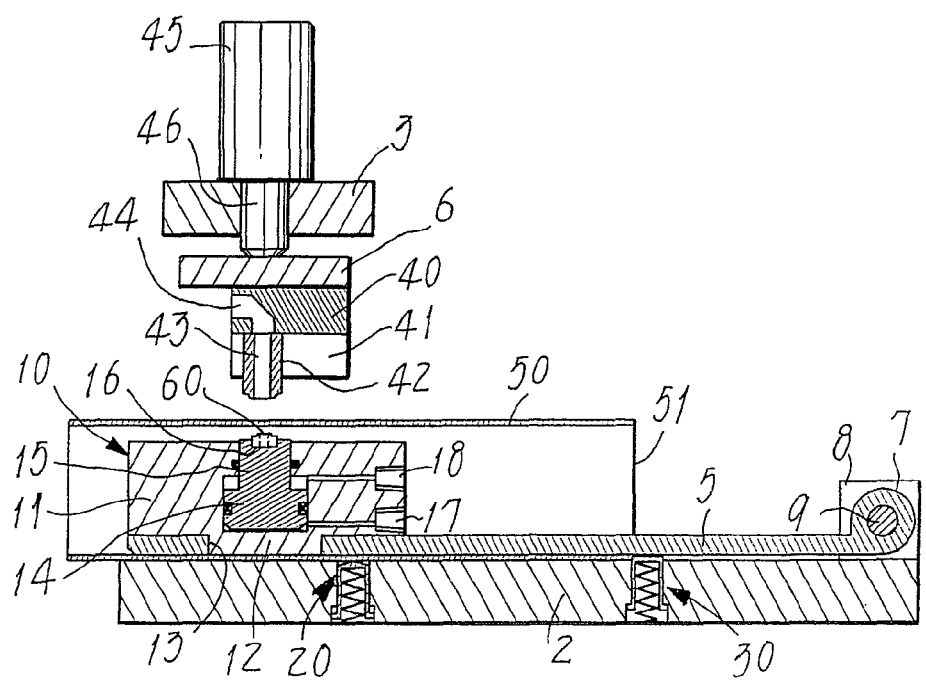
FIG. 6 is an essential longitudinal side view of the preparation process.
Figure 11:
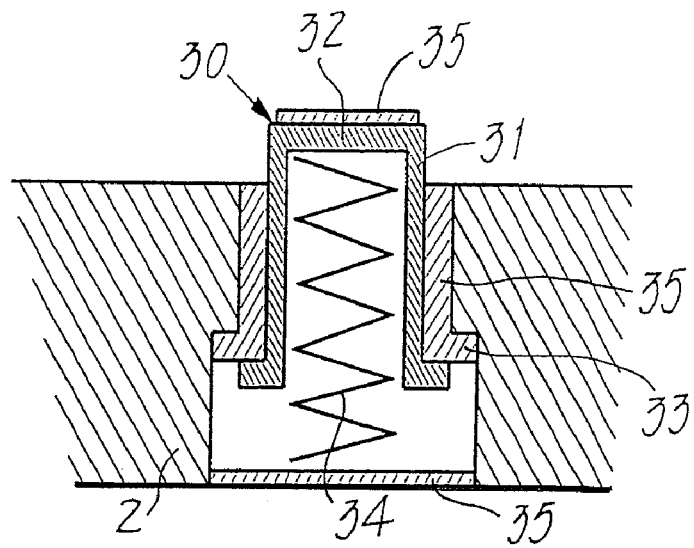
FIG. 11 is a longitudinal side view of the stopper of the press.

The stopper 30, as shown in FIG. 11, includes a flat top 32 at the upper end, and a metal cylindrical main body 31 having a flange 33 at the lower end provided movably and vertically on the lower base 2, with the flat top 32 being forced by a push-up spring 34 so as to project from the lower base 2, and abuts against and supports with the middle position or the rear end position of the movable support 5 slightly lifted by the flat top 32, and thereby abuts against and positions an opening end face 51 of a square pipe 50 attached to the movable support 5 to the lateral side of the cylindrical main body 31 (see FIG. 6). Further, to provide the stopper 30 with a touch sensor function, the cylindrical main body 31 is manufactured from a conductive metal material, and as shown in FIG. 11, an insulator 35 is interposed in the contacting position of cylindrical main body 31, lower base 2, and movable support 5, and when the opening end face 51 of the square pipe 50 attached to the movable support 5 and hydraulic cylinder 10 is positioned by abutting against the lateral side of the cylindrical main body 31 of the stopper 30, and the stopper 30 functions as the touch sensor at the same time, thereby operating the hydraulic cylinder 10 for pressing the lower pattern and a hydraulic pressure 45 for pressing the upper pattern described below.

Figure 12:
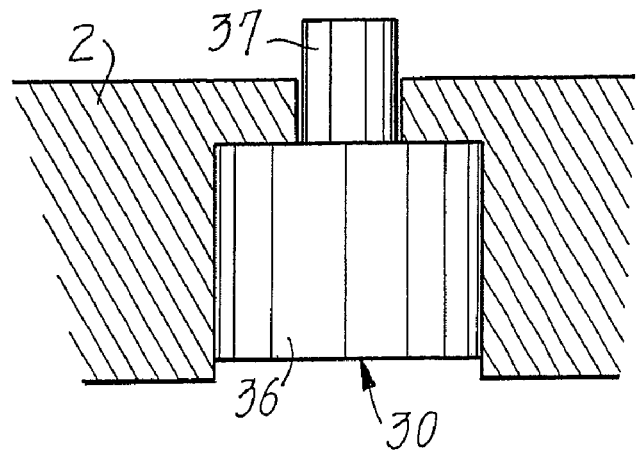
FIG. 12 is a longitudinal side view showing other preferred embodiment of the stopper of the press.

Further, as shown in FIG. 12, the stopper 30 may be formed of an air cylinder 36, and its piston rod 37 is projected from the lower base 2, thereby abutting against and supporting the movable support 5 by slightly lifting by the piston rod 37. In this case, a plurality of air cylinders 36 may be disposed on the lower base 2 in parallel state at specified intervals in the longitudinal direction of the movable support 5, and by controlling the projecting and retreating action of each air cylinder 36 and piston rod 37, the stopping position of the square pipe 50 attached to the movable support 5 can be changed, so that a plurality of nuts 60 can be automatically attached to the square pipe 50 at specific intervals.

On the other hand, the upper pattern support 6 is provided with a die holder 41 by way of a back plate 40, and a crimping die 42 is attached to the die holder 41. The back plate 40 has a scrap discharge passage 44 communicating with a hollow hole 43 of the crimping die 42, and extending obliquely upward to open to a lateral outside direction. The upper pattern support 6 is coupled and connected to a piston rod 46 of the hydraulic cylinder 45 for pressing the upper pattern installed on the upper base 3, and is moved up and down by the hydraulic cylinder 45 along the guide posts 4, 4. The crimping die 42 is positioned oppositely to the nut receiving recess 16 of the lower pattern 15 provided in the piston 14 of the hydraulic cylinder 10, and is disposed on the same axial line, and by pushing down the upper pattern support 6 by the piston rod 46 of the hydraulic cylinder 45, the crimping die 42 presses the square pipe 50 attached to the movable support 5 and hydraulic cylinder 10, there by pushing down to the lower base 2. The pressure of the hydraulic cylinder 45 for pressing the upper pattern to push down the crimping die 42 is set larger than the pressure of pushing up the piston 14 by the hydraulic cylinder 10 for pressing the upper pattern.

In the press of the invention having such configuration, the operation is described below.

Figure 5:
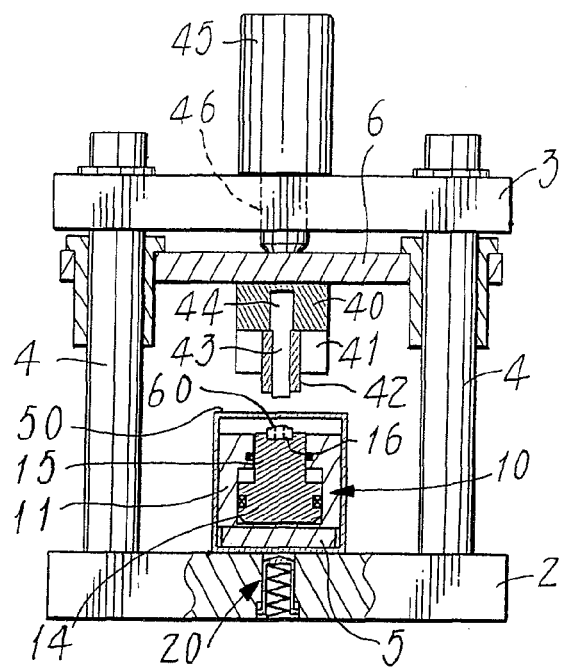
FIG. 5 is an essential longitudinal front view showing the preparation process of setting a metal square pipe on the press.

FIG. 5 and FIG. 6 shows a ready state of the metal square pipe 50 attached to the movable support 5 and hydraulic cylinder 10 for pressing the lower pattern, and held in specified position. By guiding and leading the front end opening of the square pipe 50 by the front end of the movable support 5, and attaching to the movable support 5 and hydraulic cylinder 10 for pressing the lower pattern, and inserting into the rear end side, when the opening end face 51 moves along the slope of the conical top 22 of the lifter 20, it moves while pushing down the lifter 20 by resisting the pushing spring 24, and the opening end face 51 stops at the position of abutting against the side face of the cylindrical main body 31 of the stopper 30, and the ready state is completed as shown in FIG. 5 and FIG. 6.

Next, by pushing the start switch of the operation control device not shown, the hydraulic cylinder 45 for pressing the upper pattern and the hydraulic cylinder 10 for pressing the lower pattern are sequentially put in operation, but the hydraulic cylinder 45 and hydraulic cylinder 10 are not operated unless supply of self-piercing nuts 60 in the nut receiving recess 16 of the lower pattern 15 is detected by, for example, photo sensor (not shown).

Figure 7:
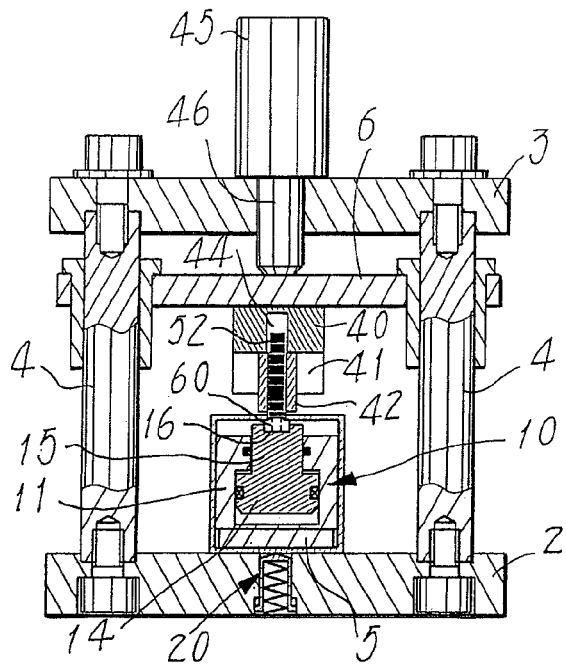
FIG. 7 is an essential longitudinal front view showing the process of attaching a self-piercing nut on a metal square pipe set on the press.
Figure 8:
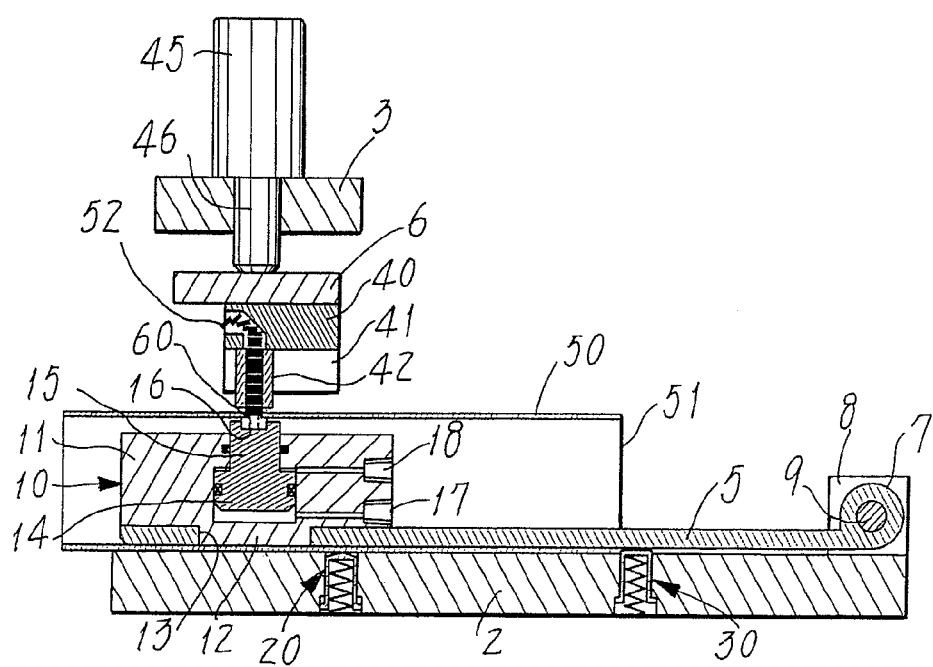
FIG. 8 is an essential longitudinal side view of the attaching process.

First, the hydraulic cylinder 45 for pressing the upper pattern is put in operation, and as shown in FIG. 7 and FIG. 8, the crimping die 42 descends together with the upper pattern support 6, and the square pipe 50 is pressed to the lower base 2. Next, the hydraulic cylinder 10 for pressing the lower pattern is put in operation, and the piston ascends 14, and the self-piercing nut 60 held in the lower pattern 15 is pressed to the inner side of the square pipe 50, and is further pushed down, and the nut 60 cooperates with the crimping die 42, and punches through the square pipe 50, and its rim is crimped by the crimping die 42, and the nut 60 is fixed to the inside of the square pipe 50. At this time, since the pressure of the crimping die 42 pushed by the hydraulic cylinder 45 for pressing the upper pattern is set larger than the pressure of the nut 61 pushed up by the hydraulic cylinder 10 for pressing the lower pattern, punching of the square pipe 50 by the nut 60 and crimping by the crimping die 42 can be realized. On the other hand, scraps 52 of the square pipe 50 punched by the nut 60 are discharged, as shown in FIG. 8, to outside through the scrap discharge passage 44 of the back plate 40 from the hollow hole 43 of the crimping die 42.

Figure 9:
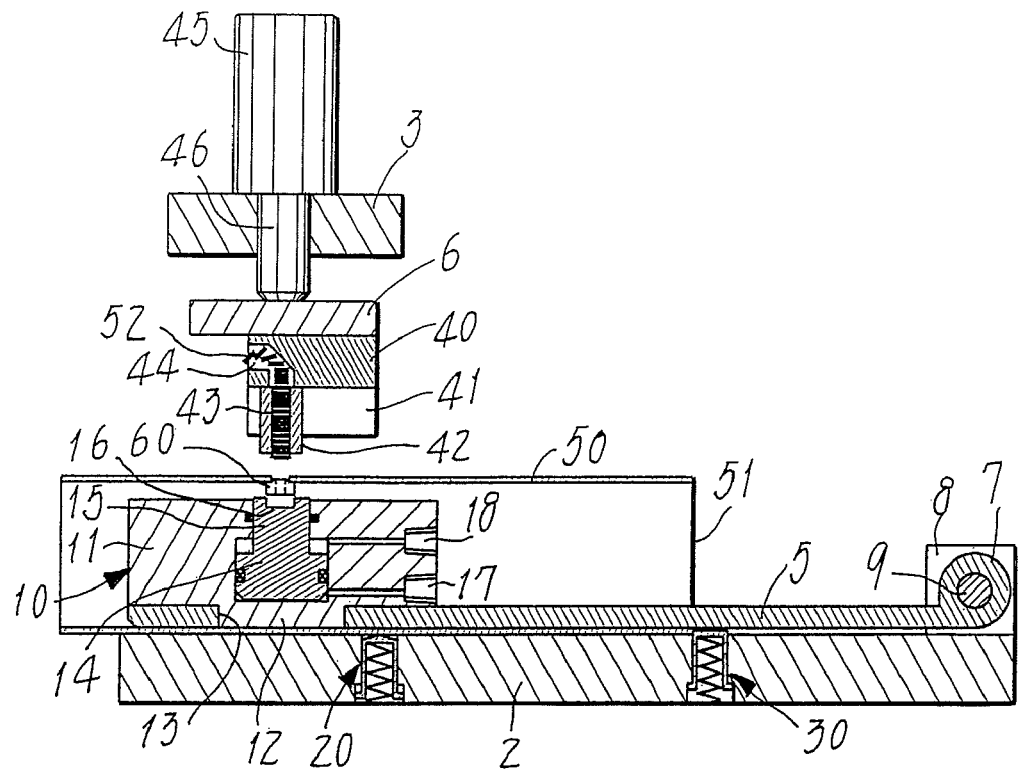
FIG. 9 is a longitudinal side view showing a completion state of the attaching process.

When the nut 60 is fixed to the square pipe 50, the hydraulic cylinder 10 for pressing the lower pattern and the hydraulic cylinder 45 return to the ready position as shown in FIG. 9. In succession, the square pipe 50 to which the nut 60 is fixed is drawn out from the movable support 5, and the next square pipe 50 is similarly attached to the movable support 5 and hydraulic cylinder 10 for pressing the lower pattern to be ready for next operation. When fixing a plurality of nuts 60 to the square pipe 50, after fixing of the nuts 60, the square pipe 50 is moved by a specified distance along the movable support 5, and the nuts 60 can be fixed similarly. When fixing nuts 60 to other three sides of the square pipe 50, the square pipe 50 to which the nuts 60 are fixed is pulled out of the movable support 5, and the direction is changed so that the fixing side of the nuts 60 may come to the upper side, and it is attached again to the movable support 5 and hydraulic cylinder 10, and the nuts 60 can be similarly fixed.

In the embodiment, the example of fixing self-piercing nuts 60 to the square pipe 50 is explained, but by modifying the outline shape of the movable support 5, the invention is also applicable to round pipes, and other pipes having irregular sectional shape.

The invention claimed is:

1. A press for attaching nuts to pipes comprising:
a frame having an upper base and a lower base, wherein the lower base supports guide posts erected at both sides of a front part of the lower base, and wherein the upper base is fixed and supported on the guide posts;
a movable support having a base end supported rotatably around a horizontal axis at a rear end of the lower base, and a front end extending to a front end side of the lower base so as to be movable circularly in a vertical direction, thereby the movable support is configured to be inserted into, and support, a pipe,
a box-like hydraulic cylinder having a cylinder case for pressing a lower pattern disposed at the front end of the movable support,
the lower pattern disposed in a piston of the box-like hydraulic cylinder, and moving up and down by projecting upward from the cylinder case,
a nut receiving recess provided at an upper end of the lower pattern,
a lifter for moving up and down a front end position of the movable support by abutting against and supporting in a slightly lifted state,
a stopper for abutting against and supporting a middle position of the movable support by lifting slightly, and the stopper moving up and down so that an end face of a pipe adjacent to an end opening of the pipe contacting the movable support may be positioned to contact the stopper, an upper pattern comprising an upper pattern support, a back plate, a die holder, and a crimping die, the upper pattern support movable up and down along the guide posts, and the crimping die disposed vertically on a same axial line as the lower pattern, and
a hydraulic cylinder having a piston rod for pressing the upper pattern disposed on the upper base, and pressing the upper pattern support downward with the piston rod disposed on the same axial line as the crimping die,
wherein an applied force from the hydraulic cylinder for pressing the upper pattern, which presses the upper pattern support and the crimping die downward, is set larger than an applied force from the box-like hydraulic cylinder for pressing the lower pattern, which presses the lower pattern upward.

2. The press as defined in claim 1, wherein the lifter has a round inclined guide surface on its top, and is forced to abut against and support the movable support by a spring or an air cylinder provided in the lower base, and when contacting the pipe to the movable support and the box-like hydraulic cylinder for pressing the lower pattern, the pipe moves along an inner side of the inclined guide surface, and the lifter is pushed down.

3. The press as defined in claim 1, wherein the stopper has a touch sensor function, and the end face of the pipe to contacting the movable support and the box-like hydraulic cylinder for pressing the lower pattern abuts against the stopper, whereby the box-like hydraulic cylinder for pressing the lower pattern and the hydraulic cylinder for pressing the upper pattern are operated automatically.

4. The press as defined in claim 1, wherein the back plate is provided with a scrap discharge passage communicating with a hollow hole of the crimping die, and an opening in the back plate in a lateral outside direction.

5. The press as defined in claim 1, wherein the box-like hydraulic cylinder is configured to be actuated by hydraulic fluid fed through an ascending hydraulic port and a descending hydraulic port on the cylinder case.

6. The press as defined in claim 1, wherein a bump extending from a bottom surface of the cylinder case is fitted in a mounting hole in the front end of the movable support, thereby accommodating the dimensions of the box-like hydraulic cylinder and minimizing a vertical height of the cylinder case.

7. A press for attaching nuts to pipes comprising:
a frame having an upper base and a lower base, guide posts erected on, and supported by, two sides of the lower base, the upper base fixed and supported on the guide posts,
a movable support having a rear end fixed to a bearing on a rear end of the lower base, a front end of the movable support extending to a front end of the lower base and movable circularly in a vertical direction, the front end of the movable support is configured to be inserted into a pipe,
a box-like hydraulic cylinder having a cylinder case disposed at the front end of the movable support, a piston in the cylinder case configured to project up and move down a lower pattern disposed in the piston,
a nut receiving recess at an upper end of the lower pattern,
a lifter abutting against, supporting, and slightly lifting the front end of the movable support, the lifter configured to move the front end of the movable support up and down,
a stopper abutting against, supporting, and slightly lifting a middle position of the movable support, the stopper configured to move up and down, a side of the stopper configured to contact an end of the pipe when the movable support is inserted into the pipe, an upper pattern having an upper pattern support on which a back plate retains a die holder that holds a crimping die, the upper pattern support configured to move up and down along the guide posts, the crimping die disposed vertically on a same axial line as the lower pattern, and a hydraulic cylinder having a piston rod disposed on the upper base and configured to press the upper pattern support downward along an axial line between the crimping die and the lower pattern with the piston rod, wherein a downward force from the hydraulic cylinder is set larger than an upward force from the box-like hydraulic cylinder.

8. The press as defined in claim 7, wherein the lifter has a round inclined guide surface on its top and is forced by a spring or an air cylinder against the movable support, and the lifter is configured to be pushed down when a pipe moves along an inner side of the inclined guide surface.

9. The press as defined in claim 7, wherein the stopper has a touch sensor function, and when the movable support is inserted into a pipe, an end face of the pipe abuts against a side of the stopper, whereby the box-like hydraulic cylinder and the hydraulic cylinder are operated automatically.

10. The press as defined in claim 7, wherein the back plate is provided with a scrap discharge passage communicating with a hollow hole of the crimping die and an opening in a lateral outside direction of the back plate.

11. The press as defined in claim 7, wherein the box-like hydraulic cylinder is configured to be actuated by hydraulic fluid fed through an ascending hydraulic port and a descending hydraulic port on the cylinder case.

12. The press as defined in claim 7, wherein a bump extending from a bottom surface of the cylinder case is fitted in a mounting hole in the front end of the movable support, thereby accommodating the dimensions of the box-like hydraulic cylinder and minimizing a vertical height of the cylinder case.

* * * * *